United States Patent
Dieckmann

(10) Patent No.: US 6,384,719 B1
(45) Date of Patent: May 7, 2002

(54) PROCESS TO PREVENT THE OVERTURNING OF A VEHICLE

(75) Inventor: Thomas Dieckmann, Pattensen (DE)

(73) Assignee: WABCO GmbH & Co. OHG, Hannover (DE)

(*) Notice: Subject to any disclaimer, the term of this patent is extended or adjusted under 35 U.S.C. 154(b) by 0 days.

(21) Appl. No.: 09/717,526

(22) Filed: Nov. 21, 2000

(30) Foreign Application Priority Data

Dec. 2, 1999 (DE) .......................... 199 58 221

(51) Int. Cl.$^7$ ................................ B60Q 1/00
(52) U.S. Cl. .................. 340/440; 340/441; 340/438; 180/282; 701/72
(58) Field of Search ................. 340/440, 441, 340/825.06, 438; 702/142, 145; 180/282, 285, 172, 197, 283, 290; 701/29, 124, 71, 72

(56) References Cited

U.S. PATENT DOCUMENTS

| | | | | |
|---|---|---|---|---|
| 3,693,145 A | * | 9/1972 | Mize | 340/440 |
| 3,778,763 A | * | 12/1973 | Johns et al. | 340/457 |
| 5,615,931 A | * | 4/1997 | Stumpe et al. | 303/22.1 |
| 5,681,998 A | * | 10/1997 | Nakazaki et al. | 73/774 |
| 5,825,284 A | * | 10/1998 | Donwoody et al. | 340/440 |
| 5,908,225 A | * | 6/1999 | Meier | 303/146 |
| 6,081,761 A | * | 6/2000 | Harada et al. | 701/72 |
| 6,170,594 B1 | * | 1/2001 | Gilbert | 180/282 |
| 6,185,489 B1 | * | 2/2001 | Strickler | 701/29 |
| 6,263,261 B1 | * | 7/2001 | Brown et al. | 701/1 |
| 6,321,141 B1 | * | 11/2001 | Leimbach | 701/1 |
| 6,324,447 B1 | * | 11/2001 | Schramm et al. | 701/1 |

FOREIGN PATENT DOCUMENTS

| | | |
|---|---|---|
| DE | 19602879 | 8/1997 |
| DE | 19746889 | 2/1999 |
| DE | 19751839 | 5/1999 |
| DE | 19751891 | 5/1999 |
| DE | 19751925 | 5/1999 |
| DE | 19830190 | 10/1999 |
| DE | 19907633 | 10/1999 |
| DE | 19904216 | 1/2000 |
| DE | 19632943 | 7/2000 |
| EP | 0798615 | 10/1997 |

* cited by examiner

Primary Examiner—Daniel J. Wu
Assistant Examiner—Toan Pham
(74) Attorney, Agent, or Firm—Proskauer Rose LLP

(57) ABSTRACT

A process for preventing overturning of a utility vehicle equipped with an ABS or EBS braking system comprises:

(a) detecting the load on two corresponding wheels on each side of the vehicle;
(b) when the vehicle is traveling in a curve to the left or right, determining the lateral acceleration of the vehicle;
(c) simultaneously determining the change in load value for the inner of the two corresponding wheels at that lateral acceleration value;
(d) repeating steps (b) and (c) for a curve in the other direction;
(e) from the lateral acceleration value and the associated changes in load values, determining and storing limit acceleration values for curves to the left and to the right, which limit acceleration values represent the lateral acceleration of the vehicle as it travels in a curve to the left or to the right which result in no load on an inner wheel of the vehicle;
(f) continuously monitoring the lateral acceleration the vehicle; and
(g) when the lateral acceleration of vehicle as it travels in a curve to the left or to the right reaches a predetermined percentage (e.g., 70–80%) of the limit acceleration value for a curve in that direction, emitting a signal which causes the vehicle to slow down, thereby preventing it from overturning. The emitted signal may be a warning signal to the driver, an actuation signal which automatically throttles the engine, or a braking signal which automatically brakes the vehicle.

10 Claims, 1 Drawing Sheet

PROCESS TO PREVENT THE OVERTURNING OF A VEHICLE

BACKGROUND OF THE INVENTION

The invention relates to a process to prevent the overturning of a utility vehicle having several axles and equipped with an anti-lock braking system (ABS).

Utility vehicles such as trucks or buses, in particular those with a high center of gravity, have a tendency to topple over in curves traveled at excessive speeds especially on roads with good grip. Such accidents cannot always be anticipated and prevented by the conventional regulation of dynamics of vehicle movement (RDVM) since in such cases the adherence limits of the wheels to the road are not exceeded until just before the wheels lift off the road. Regulation of dynamics of vehicle movement (RDVM) produces a stabilizing moment in a known manner by braking individual wheels. The need exists, however, to anticipate the threat of the vehicle overturning in sufficient time to warn the driver so that the driver can take corrective steps before it is too late.

A process of this type is known from, e.g., DE 19 602 879 C1. In this patent document, a process for the detection of toppling-over danger of a vehicle is described, in which a decrease of tilting stability of the vehicle in a curve is ascertained by using an ABS control module. When a decrease in tilting stability is detected, a light braking action is initiated on the vehicle's wheels. The known process has the advantage that additional, expensive sensors to implement the process are not needed.

Another process is known from EP 0 798 615 A1 for the improvement of travel stability (RDVM) which functions with a plurality of directly or indirectly developed vehicle data which are combined by means of a complicated algorithm. Among other things, the pressure differential between right and left air suspension bellows is also measured in this case. Sensors are installed specifically only on the towing vehicle unit in this case. The process serves to reduce the probability of the trailer overturning.

It can also be envisioned that in order to reduce the possibility of a vehicle overturning, a maximum lateral acceleration in curves could be accepted as a function of the vehicle load, decreasing as that load increases. The load in this case can be estimated through the acceleration behavior of the vehicle. It is a disadvantage of this process that the exact level of the center of gravity and the distribution of the load are not taken into consideration. Therefore, the admissible curve speeds cannot be fully utilized.

It is the object of the present invention to devise a process for preventing the overturning of a vehicle which requires only simple means and also takes into account uneven loads. In this case, the admissible vehicle speeds in curves going in either direction are to be fully utilized, especially for trucks, buses, trailers, and vehicles on rails.

SUMMARY OF THE INVENTION

This object is achieved in a process for preventing overturning of a utility vehicle equipped with an ABS or EBS braking system, which comprises:

(a) detecting the load on two corresponding wheels at each side of the vehicle;
(b) when the vehicle is traveling in a curve to the left or right, determining the lateral acceleration of the vehicle;
(c) simultaneously determining the change in load value for the inner of the two corresponding wheels at that lateral acceleration value;
(d) repeating steps (b) and (c) for a curve in the other direction;
(e) from the lateral acceleration value and the associated changes in load values, determining and storing limit acceleration values for curves to the left and to the right, which limit acceleration values represent the lateral acceleration of the vehicle as it travels in a curve to the left or to the right which result in no load on an inner wheel of the vehicle;
(f) continuously monitoring the lateral acceleration of the vehicle; and
(g) when the lateral acceleration of vehicle as it travels in a curve to the left or to the right reaches a predetermined percentage (e.g, 70–80%) of the limit acceleration value for a curve in that direction, emitting a signal which causes the vehicle to slow down thereby, preventing it from overturning. The emitted signal may be a warning signal to the driver, an actuation signal which automatically throttles the engine, or a braking signal which automatically brakes the vehicle.

BRIEF DESCRIPTION OF THE DRAWINGS

The invention is explained in further detail below with the help of the drawings, wherein.

DETAILED DESCRIPTION OF A PREFERRED EMBODIMENT

Figure 1:
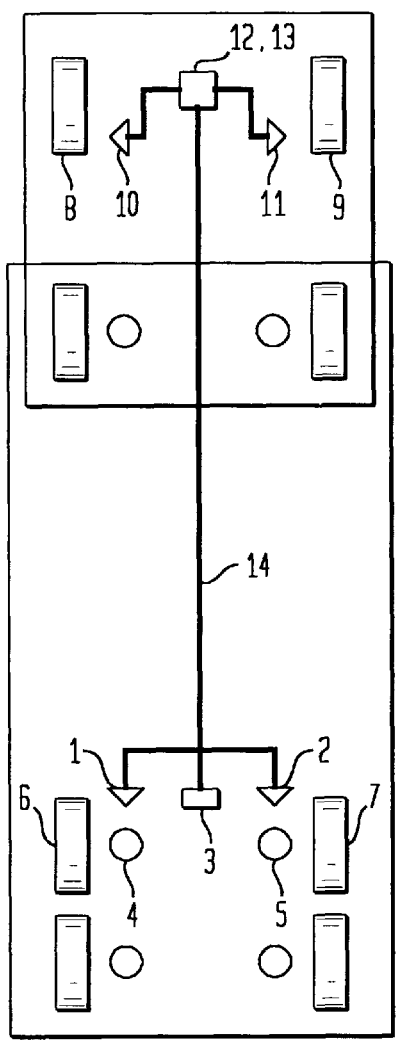
FIG. 1 is a schematic drawing of a utility vehicle (semitrailer/tractor)

FIG. 1 schematically shows a top view of a semitrailer/tractor. The latter has four axles. The front axle has wheels 8, 9 which are provided with speed sensors 10, 11. These are connected to an electronic control unit 12, 13 of an ABS braking system or an electronic braking system (EBS).

The forward rear axle of the trailer has tires 6, 7 which are also equipped with speed sensors (not shown). The axle is suspended by air suspension bellows 4, 5. The prevailing air pressure in the bellows 4, 5 is sensed by means of sensors 1, 2. In addition, a lateral-acceleration sensor 3 is installed on this axle. The three above-mentioned sensors 1, 2, 3 are connected via line 14 to the electronic control unit 12, 13.

The other axles of the trailer are also equipped with air suspension bellows, but these are not sensed for pressure. In general all wheels of the vehicle are also equipped with speed sensors (not shown).

The functioning of the process according to the invention shall be explained in further detail below with the help of FIG. 2, wherein the large curved arrow represents a curve to the left in the road.

According to the inventive process, in the first place the lateral stability of the vehicle or of the trailer in a curve at normal speed is investigated. A pair of values for an actual lateral acceleration is determined. This pair of values represents the reduction, in percentages, of the air pressure in the air suspension bellows on an inner wheel of the vehicle in both curve directions for an existing lateral acceleration.

Figure 2:
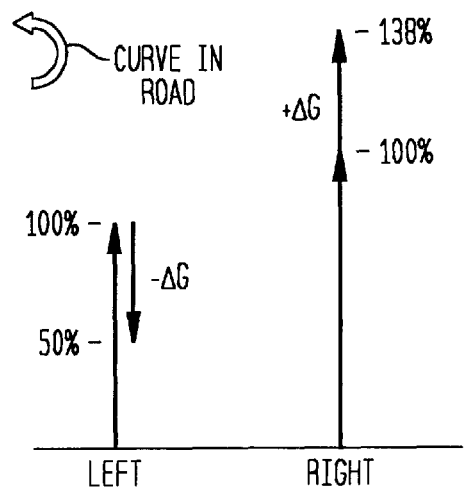
FIG. 2 is a diagram showing the pressure in the air suspension bellows on each side of a vehicle traveling in a curve (curve to the left).

For example, as shown in FIG. 2, the air pressure in the left air suspension bellows 4 of an axle is reduced from 100% to 50% when the vehicle is traveling with an actual lateral acceleration in the illustrated curve to the left in the road. At the same time, the air pressure in the right air suspension bellows 5 of this axle increases from 100% to 138%. This change in air pressure represents a shifting of weight of ΔG from the left to the right air suspension bellows.

The lateral acceleration of the vehicle in this curve is 1 m/s² This value is measured by means of the sensor 3, or is calculated from wheel speed values.

As can be seen further from FIG. 2, the air pressure for straight travel (100% value) in the left air suspension bellows is lower than in the right air suspension bellows. This is an indication that the vehicle is loaded unevenly laterally, with the right side of the vehicle being heavier than the left side in this case.

A sub-program in the electronic control unit 12, 13 now calculates an acceleration limit value for a load reduction down to 0% in the left air suspension bellows. The sub-program calculates the acceleration limit value preferably by linear extrapolation from the value pair for 50% pressure reduction at a lateral acceleration of 1 m/s² for the left curve shown in the example. In the present case, this would show a load reduction down to 0% at a limit acceleration of 2 m/s² in a curve to the left. A linear dependency of load reduction and lateral acceleration has been assumed in this case.

The above-mentioned "limit acceleration value" is now calculated and stored in the system separately for both curve directions, i.e., for left and right curves. Thus, an uneven lateral load of the vehicle is also taken into account, so that the possible curve speeds can be utilized fully.

During the operation of the vehicle, the two limit acceleration values are continuously calculated a new and stored in the electronic system. Thus, intermediate changes in loads of the vehicle which have an effect on the tilting tendency are taken into account automatically.

During travel of the vehicle, the lateral acceleration of the vehicle is measured by means of the lateral acceleration sensor 3, or by calculation from the wheel speed values measured by the wheel speed sensors 10, 11. As soon as this lateral acceleration has reached approximately 70–80%, e.g., 75% of the limit acceleration value determined above, a warning is transmitted to the driver or the vehicle speed is reduced by an automatic throttling of the engine or by automatic brake action.

The above-mentioned brake action may be selectively applied to individual wheels of the vehicle, as is known from the regulation of dynamics of vehicle movement (RDVM). In particular, it is possible to brake with varying force on the different wheels of one axle, e.g., in order to decelerate the wheels on the outside of the curve more, while the wheels on the inside of the curve are only lightly braked. In this manner, the requirement in braking force can be adapted to the wheel loads, thus improving the braking distance and lateral control.

The process according to the invention can also be applied to vehicles in which the vehicle frame is not supported by air suspension. In that case, the spring deflection or the wheel loads on either side of at least one vehicle axle are sensed instead of the pressure in the air suspension bellows.

In order to obtain measured values that can be processed, it is desirable to smooth them out in a known manner by means of a low-pass filter.

While the invention has been described by reference to specific embodiments, this was for purposes of illustration only and should not be construed to limit the spirit or the scope of the invention. Numerous alternative embodiments will be apparent to those skilled in the art and are considered to be part of the invention.

What is claimed is:

1. A process for preventing overturning of a vehicle having a plurality of axles and equipped with an ABS or an EBS braking system, said vehicle having at least one wheel on each side of said vehicle mounted on each of said axles, said method comprising:
   (a) detecting the load on corresponding wheels on each side of said vehicle,
   (b) determining a lateral acceleration value of said vehicle as it travels in a curve to the left or to the right,
   (c) simultaneously determining a change in load value for the inner one of said corresponding wheels for said lateral acceleration value,
   (d) repeating steps (b) and (c) for said lateral acceleration value as said vehicle travels in a curve in the opposite direction,
   (e) from said lateral acceleration value and the determined change in load values for curves to the left and right, determining and storing a limit acceleration value for a curve to the left and for a curve to the right which limit acceleration value represents the lateral acceleration of said vehicle when it travels in a curve resulting in no load on the inner one of said corresponding wheels;
   (f) continuously monitoring the lateral acceleration of the vehicle; and
   (g) when the lateral acceleration of the vehicle as it travels in a curve to the left or right reaches a predetermined percentage of the limit acceleration value for a curve in that direction, emitting a signal which causes the vehicle to slow down.

2. The process of claim 1 wherein the load on said corresponding wheels is detected by measuring the air pressure in air suspension bellows located at each end of the axle on which said corresponding wheels are mounted.

3. The process of claim 1 wherein the load on said corresponding wheels is detected by measuring the deflection of springs located at each end of the said axle on which said corresponding wheels are mounted.

4. The process of claim 1 wherein the load on said corresponding wheels is detected by measuring the wheel loads at each end of the axle on which said corresponding wheels are mounted.

5. The process of claim 1 wherein the signal which causes the vehicle to slow down is a warning signal to a driver of said vehicle.

6. The process of claim 1 wherein the signal which causes the vehicle to slow down is an actuation signal which automatically throttles the engine of said vehicle.

7. The process of claim 1 wherein the signal which causes the vehicle to slow down is an actuation signal which automatically brakes the vehicle.

8. The process of claim 7 wherein the actuation signal selectively brakes different wheels of said vehicle.

9. The process of claim 1 wherein the predetermined percentage is in the range of about 70% to about 80%.

10. The process of claim 1 wherein the signal which causes the vehicle to slow down is emitted automatically.

* * * * *